(12) United States Patent
Czaplewski et al.

(10) Patent No.: US 10,307,995 B2
(45) Date of Patent: Jun. 4, 2019

(54) POLYPROPYLENE IMPACT COPOLYMER BASED HOT MELT ADHESIVE

(71) Applicant: Bostik, Inc., Wauwatosa, WI (US)

(72) Inventors: Patrick John Czaplewski, New Berlin, WI (US); Steven Daniel Gray, Mequon, WI (US)

(73) Assignee: Bostik, Inc., Wauwatosa, WI (US)

( * ) Notice: Subject to any disclaimer, the term of this patent is extended or adjusted under 35 U.S.C. 154(b) by 58 days.

(21) Appl. No.: 13/987,356

(22) Filed: Jul. 16, 2013

(65) Prior Publication Data

US 2015/0024649 A1 Jan. 22, 2015

(51) Int. Cl.
| | | |
|---|---|---|
| C09J 123/14 | (2006.01) | |
| B32B 5/02 | (2006.01) | |
| B32B 27/08 | (2006.01) | |
| B32B 7/12 | (2006.01) | |
| B32B 25/08 | (2006.01) | |
| C09J 123/12 | (2006.01) | |

(Continued)

(52) U.S. Cl.
CPC ............. *B32B 25/08* (2013.01); *B32B 5/02* (2013.01); *B32B 5/022* (2013.01); *B32B 5/26* (2013.01); *B32B 7/12* (2013.01); *B32B 25/10* (2013.01); *B32B 27/12* (2013.01); *B32B 27/32* (2013.01); *C08K 5/0016* (2013.01); *C08L 23/12* (2013.01); *C08L 23/16* (2013.01); *C09J 123/12* (2013.01); *C09J 123/16* (2013.01); *B32B 2307/51* (2013.01); *B32B 2439/00* (2013.01); *B32B 2519/00* (2013.01); *B32B 2554/00* (2013.01); *B32B 2555/00* (2013.01); *B32B 2555/02* (2013.01); *C08L 2205/03* (2013.01); *C08L 2207/02* (2013.01); *Y10T 442/601* (2015.04); *Y10T 442/659* (2015.04)

(58) Field of Classification Search
None
See application file for complete search history.

(56) References Cited

U.S. PATENT DOCUMENTS

| 6,143,818 A | 11/2000 | Wang et al. | |
|---|---|---|---|
| 2002/0119722 A1* | 8/2002 | Welch et al. | ............. 442/382 |

(Continued)

FOREIGN PATENT DOCUMENTS

CN 1333032 C 8/2007

OTHER PUBLICATIONS

Plastics Technology, http://www.ptonline.com/articles/new-metallocene-tp-elastomers-tackle-films-fibers-tpos, Available online Oct. 1, 2003, page visted on Sep. 15, 2017.*

(Continued)

*Primary Examiner* — Shawn Mckinnon
*Assistant Examiner* — Lashawnda T McKinnon
(74) *Attorney, Agent, or Firm* — Christopher Lewis

(57) ABSTRACT

A hot melt adhesive using polypropylene impact copolymers that is particularly well suited for elastic attachment and stretch films in diaper structures. The hot melt adhesive composition is a blend of about 2.5% to about 30%, by weight, of a polypropylene impact copolymer; about 2.5% to about 30%, by weight, of an olefin based elastomer; about 10% to about 70%, by weight, of a tackifying resin having a softening point of at least about 80° C. and up to about 140° C.; about 0% to about 60%, by weight, of a plasticizer; and about 0.1% to about 5% of a stabilizer or antioxidant.

28 Claims, 1 Drawing Sheet

(51) Int. Cl.
*B32B 5/26* (2006.01)
*B32B 25/10* (2006.01)
*B32B 27/12* (2006.01)
*B32B 27/32* (2006.01)
*C09J 123/16* (2006.01)
*C08K 5/00* (2006.01)
*C08L 23/12* (2006.01)
*C08L 23/16* (2006.01)

(56) References Cited

U.S. PATENT DOCUMENTS

2007/0021566 A1* 1/2007 Tse ..................... C09D 123/10
525/240
2007/0042193 A1 2/2007 Wang
2007/0187032 A1* 8/2007 Wang ........................... 156/327
2007/0225455 A1* 9/2007 Jiang ..................... C08F 10/00
526/65

OTHER PUBLICATIONS

International Preliminary Report on Patentability dated Jan. 29, 2015 for corresponding PCT International Application No. PCT/US2013/000165.

PCT International Search Report and Written Opinion dated Nov. 13, 2013 for corresponding PCT International Application No. PCT/US2013/000165.

* cited by examiner

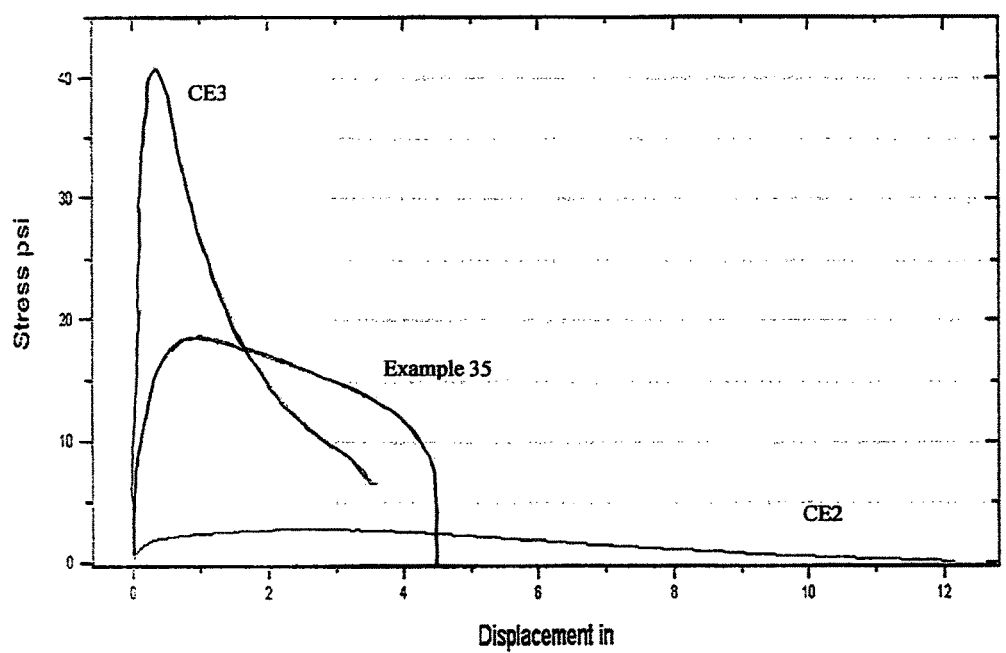

POLYPROPYLENE IMPACT COPOLYMER BASED HOT MELT ADHESIVE

BACKGROUND OF THE INVENTION

The present invention relates to hot melt adhesives, and more particularly to a hot melt adhesive using a polypropylene impact copolymer to provide high bond performance for making elastic components such as laminates containing elastic strands or films for use in disposable diapers.

The increasing complexity of manufactured goods, in particular disposable goods, leads to major improvements and developments in the hot melt adhesive industry. Hot melt adhesives are being used to bond a wider variety of substrates, within a broader adhesive application process window, and for a large end-use portfolio. For example, considering the diaper manufacturing industry, materials involved may be non-woven materials, polymeric films, and in general elastomeric components. These elastomeric components can be used in products like diapers, in a form of strands, films, nonwovens or any other continuous or discrete form.

Processability of hot melt adhesives are linked to their ability to be melted, and transported and/or coated in a molten stage at the final location where the bond is required. Usually the molten adhesive is sprayed, or coated as a film. Once cooled down, the adhesive needs to fulfill multiple requirements, like bond strength measured by peel force or bond retention under or after mechanical stress, and under or after various thermal conditions.

Typically hot melt adhesives can be based on polymers such as polyolefins (ethylene- or propene-based polymers), or functionalized polyolefins (ethylene or propene copolymers with oxygen containing monomers), or styrenic block copolymers containing at least one rubbery phase, like styrene-isoprene-styrene (SIS), or styrene-butadiene-styrene (SBS) polymers. Styrenic block copolymers are of interest due to their dual characteristics, i.e. cohesion of the styrenic phase associated with the rubbery behavior of another phase. Typical application temperatures are equal to or higher than 150° C.

Over the years, many different olefinic polymers have been used in the formulation of hot melt adhesives used in the construction of disposable soft goods. The first of these was amorphous polypropylene (APP). This material was produced as a by-product of crystalline polypropylene and was obtained by solvent extraction. This APP polymer could be combined with various tackifiers, plasticizers, waxes and fillers. to produce a hot melt that could be used for diaper construction, for example.

Later, olefin polymers became available that had much improved properties over the original APP polymers. These were referred to as amorphous poly alpha olefins (APAO). They were primarily produced using Ziegler-Natta catalysis and could be made using a variety of monomers, including but not limited to propylene, ethylene and butene. Various copolymers and terpolymers are produced by a number of manufacturers. They include Evonik Industries, who produce the Vestoplast® polymers; REXtac, LLC, who produces the Rextac® range of materials and Eastman Chemical, manufacturers of the Eastoflex® line of polymers. They are all characterized by having a very low degree of crystallinity as measured by DSC. As commercially produced, they are random polymers having broad molecular weight distributions.

More recently, metallocene catalysis has been used to make polyolefins with more precisely tailored properties. For example, the molecular weight of the polymer can be controlled in a way not possible with the older Ziegler-Natta catalysts. Polymers can be made using high levels of comonomer, such as butene-1 and octene-1, to produce polymers with very low levels of crystallinity and density. While these polymers have been used to make hot melt adhesives with better adhesion characteristics, they have not been widely used in conjunction with elastomeric bonding in the nonwovens industry because of their lack of adhesive bond retention. Examples of these metallocene polymers include Affinity® and Engage® polymers from Dow Chemical Company.

SUMMARY OF THE INVENTION

The present invention is an adhesive using polypropylene impact copolymers that is particularly well suited for elastic attachment and stretch films in diaper structures. The present invention solves the important requirement of having an olefinic based hot melt adhesive capable of using the same application techniques currently used, like coating techniques and add-on levels, while providing the end-use application the same or better level of performance expected from the current SIS and SBS based technologies, i.e. high bond strength levels in terms of creep resistance, peel force and in general bond retention with both mechanical resistance and heat resistance. When properly formulated into a hot melt adhesive, polypropylene impact copolymers offer improved performance characteristics compared to previously formulated adhesives. In particular, when formulated in combination with olefin elastomers or other polymers with low crystallinity (i.e. a low degree of crystallinity is defined as a heat of fusion as determined by differential scanning colorimetry (DSC) of between 2 Joules/gram and 100 Joules/gram, preferably between 5 Joules/gram and 80 Joules/gram), a hot melt adhesive can be produced with a unique combination of adhesion, elevated temperature creep resistance and low viscosity. This combination of properties has not previously been achieved without using a styrenic block copolymer. In addition, compared to conventional SIS based or SBS based adhesives, polypropylene impact copolymer adhesives offer improved performance stability when stored or aged at elevated temperatures.

Polypropylene impact copolymers are thermoplastic resins, unique in that they are produced through the polymerization of propylene by introducing a heterophasic structure inside a semi-crystalline polypropylene (PP) homopolymer matrix. The copolymer consists of two principal phases, a semicrystalline polypropylene homopolymer matrix, and a rubbery ethylene-propylene copolymer phase or a mixture of rubbery ethylene-propylene copolymers dispersed within the polypropylene matrix. The crystalline matrix phase provides the strength and stiffness, while the presence of the rubbery phase imparts good impact resistance, and flexibility to the adhesive composition. Polypropylene impact copolymer materials have long been commercially important materials with unique properties most appreciated by the automotive industry for use in dashboards, bumpers or other automotive parts, as well as other innumerous commercially injection molded items, cast and extruded film composites, thin-walled packaging containers and other household articles and products. Until now polypropylene impact copolymers have not shown utility in the adhesive marketplace, and as a consequence, were never formulated specifically into adhesive products or more specifically, into products intended for the adhesive bonding of films, nonwoven materials or elastomeric substrates.

These polymers lack the adhesion, open time and processability needed for adhesive applications and must be formulated correctly to achieve the desired adhesive properties. The molecular weight, melt profile, stiffness, tensile and modulus properties of polypropylene impact copolymers are generally not suited to producing effective adhesive performance. Examples of types of polypropylene impact copolymers include the various polymer grade slates such as Hostalen®, Moplen®, and Pro-Fax®, as well as several other brands available from Lyondell Basell. Polypropylene impact copolymers are also routinely produced by any of a host of companies that participate in today's injection molding polypropylene polymer marketplace.

Various methods are conventionally used to coat a hot melt adhesive at fairly low viscosity on a substrate. This can be made by roll coating or any printing type method, or by slot coating, by extrusion or by spray gun. Spray gun techniques are numerous and can be done with or without assistance of compressed air that would shape the adhesive spray, and consequently the adhesive pattern. The hot melt adhesive material is generally allowed to melt in tanks, and then pumped through hoses to the final coating spot on the substrates. Any application temperature above the softening point of the adhesive formulation is suitable, although for the preferred invention, the temperature at which the hot melt adhesive is applied should be equal to or below 177° C., preferably equal to or below 170° C., and most preferably equal to or below 163° C., so that heat sensitive substrates would not be damaged.

The viscosity (as measured via ASTM D3236-88) of the adhesive material should be generally equal to or lower than 20,000 mPas, preferably equal to or lower than 15,000 mPas, more preferably equal to or lower than 10,000 mPas, and most preferably lower than 5,000 mPas measured at 163° C. (325° F.). An adhesive with such low viscosity is needed to be operated through standard hot melt adhesive equipment and to achieve the right pattern and consequently the right bonding performance at the application temperature.

The adhesive of the present invention can be used with any process of conventional construction or stretch film attachment or elastic attachment technology as known in the state of the art.

The adhesive of the present invention can be used with any application where various substrate materials are involved like non-woven materials, polymeric films, and in general elastomeric components put in items like diapers, in the form of strands, films, nonwovens or any other continuous or discrete form. Any substrate material and any substrate form could be used in any combination possible with the adhesive serving to bond two or more substrates together. The substrates can be of multiple forms for example fiber, film, thread, strip, ribbon, coating, foil, sheet, and band. The substrate can be of any known composition for example polyolefin, polyacrylic, polyester, polyvinyl chloride, polystyrene, cellulosic like wood, cardboard and paper, or made out of mineral compounds like concrete, glass or ceramics. The substrate's mechanical behavior can be rigid, plastic or elastomeric. Among elastomeric material are various examples like natural or synthetic rubber, polyurethane based copolymers, polyether or polyester urethanes, block copolymers of styrene or of amides, or olefinic copolymers. The above lists are not limitative or all-inclusive, but are only provided as common examples. In the present invention, various methods to process hot melt adhesives can be employed, linked to their ability to be melted, and transported and/or coated or sprayed in a molten stage to the final location where the bond is required.

The adhesive of the present invention can also be used with any application where composites and disposable products are made with the help of bonding parts together while obtaining adequate cohesion from the adhesive bond to withstand mechanical stress at low, ambient or elevated temperature, in particular under creep conditions. Diaper, adult incontinence products, sanitary napkins and other absorbent disposable products are envisioned applications for the adhesive composition of the invention, as well as bed pads, absorbing pads, surgical drapes and other related medical or surgical devices. Construction applications, structural applications or packaging applications, in particular disposable items are envisioned for food or general packaging, labeling of packages, cans, or bottles, various product assembly, as well as transportation related bonding applications are also examples of where the invention is useful. The adhesives are also useful in the construction of poly and poly woven bags or articles. The most specific application of the present hot melt adhesive is for stretch film lamination, wherein the present invention allows bonding of nonwoven substrates onto elastomeric film while applying the adhesive at a temperature equal to or lower than 177° C., preferably equal to or lower than 170° C., and most preferably equal to or lower than 163° C.

BRIEF DESCRIPTION OF THE DRAWING

FIG. 1 is a graph of stress-strain curves for the compositions of Example 35 and Comparative Examples 2 and 3 described hereinafter.

PREFERRED EMBODIMENT

Accordingly, the present invention provides a hot melt adhesive composition, comprising a blend of the following components:

About 2.5% to about 30%, preferably about 5% to about 20%, and most preferably about 7.5% to about 15%, by weight, of polypropylene impact copolymer;

About 2.5% to about 30%, preferably about 5% to about 20%, and most preferably about 7.5% to about 15%, by weight, of olefin based elastomer;

About 10% to about 70%, preferably about 25% to about 65%, and most preferably about 30% to about 60%, by weight, of tackifying resin having a softening point of at least about 80° C. and up to about 140° C., and preferably a softening point of from about 95° C. to about 140° C.;

About 0% to about 60%, preferably about 10% to about 50%, more preferably about 20% to about 40%, by weight, of a plasticizer;

About 0.1% to about 5% of a stabilizer or antioxidant; and

Wherein the components total 100% by weight of the composition, and the viscosity (measured by ASTM D3236-88) of the composition is equal to or less than about 20,000 mPas at 163° C. (325° F.), preferably equal to or less than 15,000 mPas at 163° C., more preferably equal to or less than 10,000 mPas at 163° C., and most preferably equal to or less than 5,000 mPas at 163° C.

Although the primary polymer component in the present adhesive composition is a polypropylene impact copolymer, and the secondary polymer is an olefin based elastomer, blends of the polypropylene impact copolymer and secondary polymer with about 1% to about 25% by weight, preferably about 1% to about 15% by weight of an additional auxiliary polymer comprising EVA, APAO, PE, PP, PB, or a styrenic block copolymer such as, SIS, SI, SBS, SB, SIBS, SEB, SEBS, SEP, SEPS, SBBS, SEEPS and blends of each thereof, may also be used. The auxiliary polymer is a polymer that is different from the polypropylene impact copolymer, and the olefin based elastomer, and the tackifying resins, and functions to provide a desired physical property, depending on the end use of the adhesive composition.

Relatively small amounts (0-20% by weight) of a more crystalline material such as a wax may also be used as long as it does not interfere with the level of performance required by the end use.

The present invention also provides a laminate comprising a first layer of nonwoven material, a second layer of nonwoven material, and one or a plurality of elastomeric substrates, disposed between said first and second nonwoven layers, bonded together with the polypropylene impact copolymer based adhesive composition.

The laminate may also comprise a first layer of nonwoven material, a second layer of film material, and one or a plurality of elastomeric substrates disposed between said first and second layers, bonded together with the polypropylene impact copolymer-based adhesive composition. The film material may comprise a polyethylene film, a polypropylene film, an ethylene-propylene copolymer film or a cloth-like coated film material, and the elastomeric substrate may be comprised of a plurality of elastic strands.

The laminate may further comprise a first layer of nonwoven material bonded to a second layer of film or nonwoven material with the adhesive composition, and without any elastomeric substrate therebetween.

The adhesive composition and/or laminate of the present invention may be used in making a variety of end products. Examples include a disposable diaper, a sanitary napkin, a bed pad, a bandage, a surgical drape, a tape, a label, a plastic sheet, a nonwoven sheet, a paper sheet, a cardboard, a book, a filter, or a package.

In yet another aspect, the present invention provides a method of making a laminate comprising the steps of feeding a first substrate in a first direction; feeding a second substrate spaced from said first substrate in said first direction; applying the adhesive composition to one or both of said substrates; and compressing said substrates together to form the laminate.

When an elastomeric laminate is desired, the method includes the additional steps of feeding one or a plurality of elastomeric substrate or substrates between said first and second substrates in said first direction, said elastomeric substrates are stretched before, during or after adhesive application; and applying the adhesive composition to either said elastomeric substrate or substrates or one or both of said substrates before compressing the substrates together. The elastomeric substrate is preferably at least one elastic strand stretched up to 500% from its initial relaxed state.

DETAILED DESCRIPTION OF THE INVENTION

The primary polymer component used in the adhesive composition is a polypropylene impact copolymer. More specifically it is a propylene-ethylene impact copolymer. Propylene-ethylene impact copolymers are crystalline polymers that exhibit high stiffness and excellent impact strength. Such impact copolymers, which are available from a variety of suppliers, contain comparatively low percentages of ethylene by weight and can have a wide range of melt flow indicies and physical properties.

A polypropylene impact copolymer as defined in the present invention is a heterophasic copolymer typically having a high impact strength relative to a homopolymer of similar melt flow rate. Heterophasic polymers are multiple phase polymers having a continuous polymer phase (also referred to as the matrix phase) and a discontinuous polymer phase (also referred to as the rubber phase or the elastomeric phase) dispersed within the continuous polymer phase. A heterophasic polymer may contain more than two polymer phases. In a polypropylene impact copolymer, the continuous phase comprises a semi-crystalline propylene-based polymer and the discontinuous phase comprises an ethylene-propylene copolymer. The "matrix polymer," refers to the portion of the polypropylene impact copolymer that comprises a majority weight percent polymerized propylene monomer (based on the total weight of polymerizable monomers), and optionally may comprise at least one (or more) polymerized comonomer(s), such as ethylene. The propylene-based polymer can be a propylene homopolymer or an interpolymer. A propylene interpolymer means a polymer prepared by the polymerization of propylene with at least one other monomer, such as ethylene. The "elastomeric phase" of the polypropylene impact copolymer comprises polymer units derived from ethylene, propylene, and, optionally, polymer units derived from at least one other $\alpha$-olefin monomer. In some embodiments, the impact copolymers have melt flow rates at 230° C., of at least 0.5 g/10 min, all the way up to about 1000 g/10 min. Preferred polypropylene impact copolymers have melt flow rates of between 10 and 250 g/10 min using ASTM D-1238 with a temperature of 230° C. and a 2.16 kg weight. More preferred are melt flow rates of between 20 and 200 g/10 minutes. Most preferred melt flow rates are between 50 and 150 g/10 minutes. Preferred polypropylene impact copolymers useful in this invention are available from LyondellBasell under the trade name designation Pro-Fax®.

The polypropylene impact copolymer is generally present in the adhesive compositions in amounts of about 2.5 to 30% by weight of the composition, preferably about 5 to 20% by weight are utilized, and most preferably about 7.5 to 15% by weight. Blends of two or more polypropylene impact copolymers may also be used. For example, a blend of a first polypropylene impact copolymer and a second polypropylene impact copolymer that is different than the first polypropylene impact copolymer may also be employed. From about 0% to about 30% by weight of one or more additional polypropylene impact copolymer may be blended together with the first polypropylene impact copolymer if desired.

The olefin elastomer useful in the present invention is of the metallocene catalyst technology polyolefin elastomeric polymers within a larger group of olefins. Olefins are unsaturated hydrocarbons and the most typical monomers used in polyolefins are ethylene and alpha-olefins containing up to ten carbon atoms. Principal olefin monomers include ethylene, propylene, butene, 1,4-methylpentene, hexene, octene and combinations thereof. Polyolefins include ethylene polymers, propylene polymers, and combinations thereof including combinations with other $C_4$-$C_{10}$ alpha-olefins. Elastomeric polyolefins typically contain ethylene and propylene, and may contain other $C_4$-$C_{10}$ olefin monomer units. Some particularly preferred polyolefin polymers are copolymers of propylene with at least one other olefin monomer, such as ethylene-propylene copolymers and ethylene-octene copolymers. Although any polymer falling in the range of properties herein described above can be used, a preferred grade of polyolefin polymers useful in this invention are available from Dow Chemical Co. under the trade name designation Versify®. The most preferred polymers are metallocene polymerized propylene/ethylene elastomers, which can be obtained from ExxonMobil Chemical under the trade name designation Vistamaxx®.

| Grade of Vistamaxx ® | Ethylene Content (wt. %) | Melt Index (g/10 min) (190° C./2.16 kg) | Density (g/cc) |
|---|---|---|---|
| 3000 | 11.0 | 3.6 | 0.873 |
| 3020 FL | 11.0 | 1.1 | 0.874 |
| 3980 FL | 9.0 | 3.7 | 0.878 |
| 6102 | 16.0 | 1.5 | 0.862 |
| 6102 FL | 16.0 | 1.5 | 0.862 |
| 6202 | 15.0 | 9.1 | 0.863 |
| 6202 FL | 15.0 | 9.1 | 0.863 |

As shown, the Vistamaxx grades range from about 9% to about 16% by weight ethylene, a melt Index of from about 1 to about 10 g/10 min, and a density of from about 0.86 to 0.88 grams/cubic centimeter. One particularly preferred grade is Vistamaxx® 6202, which is a metallocene catalyzed propylene/ethylene elastomer with about 85% propylene and 15% ethylene and has a Melt Index (190° C./2.16 kg) of 9.1 g/10 minutes and a density of 0.863 g/cc. The Versify grades of metallocene catalyzed propylene/ethylene copolymer elastomers have melt flow rates of about 2 to 25 g/10 min (ASTM D-1238 at 230° C. using a 2.16 kg weight), and densities of from about 0.8585 grams/cubic centimeter (g/cc) to about 0.8880 grams/cubic centimeter (g/cc). The Versify grades of elastomers also have an ethylene comonomer content of from about 5% to about 15% by weight.

The olefin elastomer is generally present in the adhesive compositions in amounts of about 2.5 to 30% by weight of the composition, preferably about 5 to 20% by weight are utilized, and most preferably about 7.5 to 15% by weight. Blends of two or more olefin elastomers may also be used. For example, a blend of a first olefin elastomer and a second olefin elastomer that is different than the first olefin elastomer may also be employed. From about 0% to about 30% by weight of one or more additional olefin elastomer may be blended together with the first olefin elastomer if desired.

A tackifying resin, as defined in the present description can be a molecule or a macro-molecule, generally a chemical compound or a fairly low molecular weight polymer, compared to common polymers, from a natural source or from a chemical process or combination thereof that in general enhances the adhesion of a final hot melt adhesive composition. Representative resins include the $C_5/C_9$ hydrocarbon resins, synthetic polyterpenes, rosin, rosin esters, natural terpenes, and the like. More particularly, the useful tackifying resins include any compatible resins or mixtures thereof such as (1) natural and modified rosins including gum rosin, wood rosin, tall oil rosin, distilled rosin, hydrogenated rosin, dimerized rosin, and polymerized rosin; (2) glycerol and pentaerythritol esters of natural and modified rosins, including the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) copolymers and terpolymers of natural terpenes, such as styrene/terpene and alpha methyl styrene/terpene; (4) polyterpene resins generally resulting from the polymerization of terpene hydrocarbons, such as the bicyclic monoterpene known as pinene, in the presence of Friedel-Crafts catalysts at moderately low temperatures; also included are the hydrogenated polyterpene resins; (5) phenolic modified terpene resins and hydrogenated derivatives thereof such, for example, as the resin product resulting from the condensation, in an acidic medium, of a bicyclic terpene and a phenol; (6) aliphatic petroleum hydrocarbon resins resulting from the polymerization of monomers consisting primarily of olefins and diolefins; also included are the hydrogenated aliphatic petroleum hydrocarbon resins; and (7) cyclic petroleum hydrocarbon resins and the hydrogenated derivatives thereof. Mixtures of two or more of the above described tackifying resins may be required for some formulations. Also included are the cyclic or acylic C5 resins and aromatic modified acyclic or cyclic resins.

The tackifying resin should have a Ring and Ball softening point (measured by ASTM E28) of at least about 95° C., and preferably between about 95° C. and about 140° C., and most preferably the softening point is between about 95° C. and about 130° C. A preferred tackifier is a hydrogenated aromatic modified dicyclopentadiene resin with a Ring and Ball softening point between about 100° C. to 130° C. and can be obtained from ExxonMobil Chemical under the tradename of Escorez 5600 and 5615.

Also, other preferred tackifying resins are partially hydrogenated aliphatic hydrocarbon resins such as Eastotac® H100L and Eastotac® H100R, as well as non-hydrogenated aliphatic C5 resins and aromatic modified C5 resins with low aromaticity such as Piccotac® 1095 and Piccotac® 9095, respectively.

The tackifiers are generally present in the adhesive compositions in an amount greater than the amount of the polypropylene impact copolymer. Within this range, amounts of about 10 to 70% by weight of the composition, preferably about 25 to 65% by weight are utilized, and most preferably about 30 to 60% by weight. Blends of two or more tackifying resins may also be used. For example, a blend of a first tackifying resin and a second tackifying resin that is different than the first tackifying resin may also be employed. From about 0% to about 65% by weight of one or more additional tackifying resins may be blended together with the first tackifying resin if desired.

The plasticizer component useful in the present invention may be selected from any of the mineral based oils, petroleum based oils, liquid resins, liquid elastomers, polybutene, polyisobutylene, phthalate and benzoate plasticizers, and epoxidized soya oil. A plasticizer is broadly defined as a typically organic composition that can be added to the thermoplastic rubbers and other resins to improve extrudability, flexibility, workability and stretchability in the finished sealant. Any material which flows at ambient or application temperatures and is compatible in the compositions of the present invention may be useful. Preferably, the plasticizer has low volatility at temperatures of greater than about 40° C. The most commonly used plasticizers are oils which are primarily hydrocarbon oils, low in aromatic content and are paraffinic or naphthenic in character. The oils are preferably low in volatility, transparent and have as little color and odor as possible. This invention also contemplates the use of olefin oligomers, low molecular weight polymers, vegetable oils and their derivatives and similar plasticizing oils. Solid plasticizers may also be useful to the present invention. Examples of such plasticizers include 1,4-cyclohexane dimethanol dibenzoate, glyceryl tribenzoate, pentaerythritol tetrabenzoate, and dicylcohexylphthalate. Preference is given to the petroleum based oils with suitable naphthenic minerals oils useful in this invention of the types herein described above are commercially available from Nynas, under the trade name Nyplast®.

The composition of the present invention may also contain from about 0 to 30% by weight, of a surfactant to make the adhesive more hydrophilic and to impart water permeability to the composition. The surfactants suitable for use herein comprise cationic, anionic or nonionic types. The more preferred surfactant is selected from a group of nonionic surfactants having HLB less than 15. These surfactants include alkyl amines and amides; alkanolamines and amides; amine oxides; ethoxylated fatty alcohols, ethoxylated fatty acids, ethoxylated alkylphenols, ethoxylated amines or amides; ethoxylated fatty esters and oils; glycerol fatty esters and their ethoxylated derivatives; sorbitan derivatives; sucrose and glucose esters and their derivatives. The most preferred surfactants will have a HLB between 3 and 12 and are selected from a subgroup including ethoxylated fatty alcohols, ethoxylated fatty acids, stearic acid, glycerol esters of fatty acids and their derivatives and sorbitan derivatives. Mixtures of two or more surfactants herein described above may be used for some formulations.

As used herein, the term "surfactant" or "surface-active agent" refers to any compound that reduces surface tension when dissolved in water or water solutions, or which reduces interfacial tension between two liquids, or between a liquid and a solid. Examples of suitable surfactants include, but are not limited to, the following:

1. Fatty acid esters such as glycerol esters, PEG esters, and sorbitan esters, including ethylene glycol distearate, ethylene glycol monostearate, glycerol mono and/or dioleate, PEG dioleate, PEG monolaurate, sorbitan monolaurate, sorbitan trioleate, etc. These surfactants are available from ICI, Rhone-Poulenc, and other sources.
2. Nonionic ethoxylates such as alkylphenol ethoxylates, alcohol thoxylates, alkylamine ethoxylates, etc., including octylphenol ethoxylate, nonylphenol ethoxylate, alkylamine ethoxylates, etc. These surfactants are available from Rhone-Poulene, Union Carbide, and other sources.
3. Nonionic surfactants such as 2,4,7,9-tetramethyl-5-decyn-4,7-diol available from Air Products.
4. Ethylene oxide/propylene oxide copolymers which are available from Union Carbide, BASF, etc. It should be noted that these and other surfactants can be blended if necessary to produce the best blend of hydrophilic performance properties.

Atmer® 129, a glycerol monostearate, manufactured by Uniquema Corporation, Atmer® 688, a nonionic surfactant blend manufactured by ICI Americas, Inc., and Aerosol® OT 100% surfactant (dioctyl sodium sulfosuccinate) made by Cytec Industries, Inc. have been found to be preferred surfactants for use in the present adhesive composition.

The present invention may include a stabilizer in an amount of from about 0% to about 5% by weight. Preferably from about 0.1% to 5% of a stabilizer is incorporated into the composition. The stabilizers which are useful in the hot melt wetness indicator adhesive compositions of the present invention are incorporated to help protect the polymers noted above, and thereby the total adhesive system, from the effects of thermal and oxidative degradation which normally occurs during the manufacture and application of the indicator as well as in the ordinary exposure of the final product to the ambient environment. Among the applicable stabilizers are high molecular weight hindered phenols and multi-function phenols, such as sulfur and phosphorous-containing phenols. Hindered phenols are well known to those skilled in the art and may be characterized as phenolic compounds that also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency and correspondingly, its reactivity; this steric hindrance thus providing the phenolic compound with its stabilizing properties. Representative hindered phenols include:

1,3,5-trimethyl-2,4,6-tris(3-5-di-tert-butyl-4-hydroxybenzyl) benzene;
pentaerythritol tetrakis-3(3,5-di-tert-butyl-4-hydroxyphenyl)propionate;
n-octadecyl-3(3,5-di-tert-butyl-4-hydroxyphenyl) propionate;
4,4'-methylenebis(4-methyl-6-tertbutylphenol);
2,6-di-tert-butylphenol;
6-(4-hydroxyphenoxy)-2,4-bis(n-octylthio1,3,5-triazine;
2,3,6-tris(4-hydroxy-3,5-di-tert-butyl-phenoxy1,3,5-triazine
di-n-octadecyl-3,5-di-tert-butyl-4-hydroxybenzylphosphonate;
2-(n-octylthio)ethyl-3,5-di-tert-butyl-4-hydroxybenzoataen; and
sorbitol hexa-3(3,5-di-tert-butyl-4-hydroxy-phenyl)propionate.

Especially preferred as a stabilizer is pentaerythritol tetrakis-3(3,5-ditert-butyl-4-hydroxyphenol) propionate.

The performance of these stabilizers may be further enhanced by utilizing, in conjunction therewith; (1) synergists such as, for example, thiodipropionate esters and phosphites; and (2) chelating agents and metal deactivators such as, for example, ethylenediamenetetraacetic acid, salts thereof, and disalicylalpropylenediimine.

It should be understood that other optional additives may be incorporated into the adhesive composition of the present invention in order to modify particular physical properties. These may include, for example, such materials as ultraviolet light (UV) absorbers, surfactants, inert colorants, e.g., titanium dioxide, fluorescing agents and fillers. Typical fillers include talc, calcium carbonate, clay silica, mica, wollastonite, feldspar, aluminum silicate, alumina, hydrated alumina, glass microspheres, ceramic microspheres, thermoplastic microspheres, baryte and wood flour.

The hot melt adhesive composition of the present invention may be formulated using any of the techniques known in the art. A representative example of the mixing procedure involves placing all the components, except the copolymer, in a jacketed mixing kettle equipped with a rotor, and thereafter raising the temperature of the mixture to a range from 149° C. to 190° C. to melt the contents. It should be understood that the precise temperature to be used in this step would depend on the melting points of the particular ingredients. The copolymer is subsequently introduced to the kettle under agitation and the mixing is allowed to continue until a consistent and uniform mixture is formed. The contents of the kettle may be protected with inert gas such as carbon dioxide and nitrogen during the entire mixing process.

The resulting hot melt adhesive may then be applied to substrates using a variety of coating techniques. Examples include hot melt slot die coating, hot melt wheel coating, hot melt roller coating, melt-blown coating and spiral spray coating.

The adhesive composition of the present invention may be used in a number of applications such as, for example, in disposable nonwoven hygienic articles, paper converting, flexible packaging, wood working, carton and case sealing, labeling and other assembly applications. Particularly preferred applications include disposable diaper and feminine sanitary napkin construction, diaper and adult incontinent brief elastic attachment, diaper and napkin core stabilization, diaper backsheet lamination, industrial filter material conversion, surgical gown and surgical drape assembly.

Tests and Materials

Brookfield viscosity was tested according to ASTM D-3236 Method at 163° C.

Ring & Ball softening point was determined with an automated Herzog unit according to ASTM E-28 method.

Dynamic Temperature Testing (ASTM D4440-01)

The rheology of a given hot melt adhesive can be determined using a TA Instruments rheometer, such as an Ares 3 model. For the adhesives listed in the tables below, a temperature step procedure was used to determine the storage modulus, G', at various temperatures as well as the glass transition temperature, Tg. The instrument was set to a frequency of 10 radians per second and the temperature was varied from +140° C. to −40° C. The parallel plates used had a 25 mm diameter and a 1.6 millimeter gap.

The stress-strain data in FIG. 1 was generated using an Instron tensile tester run at a crosshead speed of 2 inches/minute at 72° F. and 50% relative humidity in accordance with ASTM D-638.

In General

In the specification and in the claims, the terms "including" and "comprising" are open-ended terms and should be interpreted to mean "including, but not limited to . . . ." These terms encompass the more restrictive terms "consisting essentially of" and "consisting of."

As used herein and in the appended claims, the singular forms "a," "an," and "the" include plural reference unless the context clearly dictates otherwise. As well, the terms "a" (or "an"), "one or more" and "at least one" can be used interchangeably herein. It is also to be noted that the terms "comprising," "including," "characterized by" and "having" can be used interchangeably.

Where a range of values is provided, it is understood that each intervening value, and any combination or subcombination of intervening values, between the upper and lower limit of that range and any other stated or intervening value in that stated range, is encompassed within the range of values recited.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number, and thus will typically refer to a number or value that is 10% below or above the specifically recited number or value.

Unless defined otherwise, all technical and scientific terms used herein have the same meanings as commonly understood by one of ordinary skill in the art to which this invention belongs. All publications and patents specifically mentioned herein are incorporated by reference in their entirety for all purposes including describing and disclosing the chemicals, instruments, statistical analyses and methodologies which are reported in the publications which might be used in connection with the invention. All references cited in this specification are to be taken as indicative of the level of skill in the art. Nothing herein is to be construed as an admission that the invention is not entitled to antedate such disclosure by virtue or prior invention.

Examples 1 to 26

Procedure:

All formulations were produced on a 300 g scale, using the following method. A 475 mL steel vessel was charged with mineral oil, antioxidant, tackifying resin, and, where present, wax. A digitally-controlled heating mantel and an internal thermocouple, inside the vessel, were used in tandem to gradually heat the formulation to the target temperature (177 to 190° C.). After the mixture appeared mostly homogenous, the solution was mechanically stirred between 100 to 200 rpm, and the low modulus polyolefin (PO) was gradually added followed by the impact copolymer (ICP). The resultant clear to slightly hazy molten mixture was held at the target temperature an additional 30 to 120 minutes until it appeared to be fully homogenized. After this time, the vessel was removed from the heating mantel and samples were collected for testing. Table 1 outlines example compositions of this invention, while key physical properties are provided in Table 2.

TABLE 1

Example 1-26 Formulations[a]

| Example | Plasticizer[b] wt % | Tackifying Resin[c] wt % | Low Mod PO[d] wt % | ICP[e] wt % | Wax[f] wt % |
|---|---|---|---|---|---|
| 1 | 32.5 | 25.0 | 15.4 | 16.6 | 10.0 |
| 2 | 23.3 | 47.7 | 16.9 | 4.7 | 6.9 |
| 3 | 40.0 | 39.3 | 4.7 | 5.5 | 10.0 |
| 4 | 20.1 | 54.3 | 1.1 | 18.7 | 5.3 |
| 5 | 25.5 | 39.2 | 19.7 | 9.5 | 5.6 |
| 6 | 22.3 | 41.2 | 14.2 | 15.2 | 6.6 |
| 7 | 37.9 | 37.3 | 1.6 | 15.5 | 7.2 |
| 8 | 40.0 | 26.9 | 20.0 | 12.6 | 0.0 |
| 9 | 38.6 | 29.1 | 19.4 | 2.5 | 9.9 |
| 10 | 38.7 | 35.7 | 12.0 | 9.1 | 4.0 |
| 11 | 31.8 | 47.0 | 13.1 | 1.2 | 6.4 |
| 12 | 37.7 | 41.3 | 1.1 | 18.1 | 1.3 |
| 13 | 24.5 | 55.0 | 4.4 | 5.6 | 10.0 |
| 14 | 23.2 | 46.0 | 16.2 | 9.7 | 4.4 |
| 15 | 40.0 | 25.6 | 3.9 | 20.0 | 10.0 |
| 16 | 38.3 | 46.0 | 5.6 | 6.2 | 3.4 |
| 17 | 31.9 | 42.6 | 12.0 | 6.6 | 6.4 |
| 18 | 25.0 | 35.9 | 17.0 | 16.6 | 5.0 |
| 19 | 22.3 | 41.1 | 14.2 | 15.2 | 6.7 |
| 20 | 23.6 | 44.6 | 8.9 | 19.1 | 3.3 |
| 21 | 23.2 | 46.0 | 16.2 | 9.7 | 4.4 |
| 22 | 33.8 | 42.2 | 3.7 | 18.3 | 1.5 |
| 23 | 23.2 | 46.0 | 16.2 | 9.7 | 4.4 |
| 24 | 39.5 | 39.3 | 20.0 | 0.0 | 0.7 |
| 25 | 32.9 | 43.4 | 9.1 | 10.1 | 4.0 |
| 26 | 34.3 | 45.2 | 9.5 | 10.5 | 0.0 |

[a]All formulations include 0.5 wt % Tris(2,4-di-tert-butylphenyl) phosphite antioxidant;
[b]Nynas Nyflex 222B Mineral Oil;
[c]Exxon-Mobil Escorez 5615 Petroleum Hydrocarbon Resin;
[d]Exxon-Mobil Vistamaxx 6202 (propylene based elastomer);
[e]LyondellBasell Pro-fax EP501V (propylene-based impact copolymer);
[f]Alphamin 104 N (polyethylene wax homopolymer).

Raw Materials Used in Table 1:

Nyflex 222B is a hydrotreated napthenic process oil available from Nynas Corporation.

Escorez 5615 is a hydrogenated aromatic modified cycloaliphatic hydrocarbon resin with a 130° C. softening point. It is available from ExxonMobil Chemical.

Vistamaxx 6202 is a metallocene catalyzed propylene based elastomer available from ExxonMobil Chemicals. It contains 85% propylene and 15% ethylene by weight. It has a Melt Index (190° C./2.16 kg) of 9:1 grams/10 minutes and a density of 0.863 g/cc.

Pro-fax EP501V is a propylene impact copolymer available from Lyondellbasell Polymers. It is an ethylene propylene rubber dispersed within a semi-crystalline polypropylene homopolymer matrix. EP 501V has a Melt Flow Rate (230° C./2/16 kg) of 100 grams/10 min. and a density of 0.90 g/cc.

104N wax is a polyethylene wax with a Ring & Ball softening point of 118° C. and a density of 0.93 g/cc. It is available from Hana Corporation.

As shown in Table 2, the inclusion of impact copolymer leads to formulations with significantly improved thermal resistance as evidenced by the elevated softening and crossover temperatures. Coupled with the higher crossover values, the lower tan delta values given by the ICP (impact copolymer) containing formulations suggests they will display improved elasticity and cohesive strength. The latter is noteworthy as the enhanced cohesive properties are obtained at low formulated viscosities when the ICP is present.

TABLE 2

Rheological and Thermal Properties of Examples 1-26

| Example | Viscosity, 163° C. cP | RBSP[a] ° C. | T-xover[b] ° C. | tan delta (DMA)[c] |
|---|---|---|---|---|
| 1 | 21,350 | 151 | 110 | 0.31 |
| 2 | 11,000 | 148 | 83 | 0.46 |
| 3 | 495 | 140 | 88 | 0.31 |
| 4 | 7,100 | 153 | 118 | 0.26 |
| 5 | 25,000 | 150 | 90 | 0.25 |
| 6 | 23,900 | 152 | 102 | 0.16 |
| 7 | 1,985 | 146 | 97 | 0.25 |
| 8 | 20,100 | 147 | 90 | 0.22 |
| 9 | 5,912 | 138 | 85 | 0.37 |
| 10 | 4,962 | 145 | 87 | 0.24 |
| 11 | 2,130 | 114 | 78 | 0.59 |
| 12 | 2,630 | 146 | 106 | 0.40 |
| 13 | 890 | 145 | 91 | 0.38 |
| 14 | 18,200 | 150 | 97 | 0.37 |
| 15 | 4,975 | 149 | 108 | 0.20 |
| 16 | 860 | 140 | 82 | 0.42 |
| 17 | 4,240 | 145 | 90 | 0.31 |
| 18 | 35,200 | 152 | 106 | 0.12 |
| 19 | 27,600 | 152 | 109 | 0.15 |
| 20 | 17,425 | 152 | 119 | 0.20 |
| 21 | 17,320 | 150 | 107 | 0.31 |
| 22 | 4,875 | 148 | 107 | 0.24 |
| 23 | 19,100 | 149 | 92 | 0.39 |
| 24 | 4,987 | 87 | 54 | 0.67 |
| 25 | 4,230 | 146 | 98 | 0.25 |
| 26 | 4,962 | 145 | 91 | 0.34 |

[a]Ring and ball (Herzog) softening point (glycerol);
[b,c]Cross-over temperature (T-xover) and tan delta from dynamic mechanical analysis data collected on ARES rheometer from 170 to −40° C. at 10 rad/s on 25 mm parallel plates

Examples 27 to 34 and Comparative Example 1

Comparative Example 1 (CE1) as well as invention Examples 27 to 34 were prepared as described above. Compositions and physical properties are provided in Table 3. Examples 27 to 29, relative to CE1, show the utility of this invention as even low levels of ICP can be used to significantly improve thermal properties. Examples 30 and 31 highlight a general nature of this invention around the use of low modulus polyolefins to provide compatible adhesive formulations with low viscosities and high thermal resistance. Examples 32 through 34 display another general trend of this invention, illustrating the use of ICP in conjunction with multiple low modulus polyolefins (Low Mod PO) to allow the viscosity and overall adhesive properties to be fine-tuned based on end-use applications needs.

TABLE 3

Example 27 to 33 and CE1 Formulations and Physical Properties

| Ex. | Plasticizer[b] wt % | Tackifier[c] wt % | Low Mod PO[d] wt % | 2nd PO wt % | ICP[g] wt % | Viscosity[h] cP | RBSP[i] ° C. |
|---|---|---|---|---|---|---|---|
| CE1 | 32.7 | 43.1 | 19.0 | 0.0 | 0.00 | 2,975 | 85 |
| 27 | 32.7 | 43.1 | 4.8 | 0.0 | 14.3 | 1,840 | 146 |
| 28 | 32.7 | 43.1 | 9.5 | 0.0 | 9.5 | 2,195 | 144 |
| 29 | 32.7 | 43.1 | 14.3 | 0.0 | 4.8 | 2,570 | 142 |
| 30 | 32.7 | 43.1 | 0.0 | 9.5[e] | 9.5 | 707 | 143 |
| 31 | 32.9 | 43.4 | 0.0 | 9.1[f] | 10.1 | 3,001 | 143 |
| 32 | 32.7 | 43.1 | 4.5 | 4.5[e] | 9.5 | 1,288 | 143 |
| 33 | 35.2 | 38.1 | 5.4 | 5.4[e] | 10.8 | 1,675 | 144 |
| 34 | 40.2 | 28.1 | 6.6 | 6.6[e] | 13.2 | 2,920 | 146 |

[a]All formulations include 0.48 wt % Tris(2,4-di-tert-butylphenyl) phosphite antioxidant and 4.8 wt % Bareco PX-100 synthetic paraffin wax;
[b]Nynas Nyflex 222B Mineral Oil;
[c]Exxon-Mobil Escorez 5615 Petroleum Hydrocarbon Resin;
[d]Exxon-Mobil Vistamaxx 6202 (propylene based elastomer);
[e]Idimitsu S600X L-MODU Polypropylene;
[f]Dow Infuse 9807 Olefin Block Copolymer;
[g]LyondellBasell Pro-fax EP501V (propylene-based impact copolymer).
[h]Brookfield viscosity at 177° C.;
[i]Ring and ball (Herzog) softening point (glycerol).

Comparative Example 2 (Ce2) and Example 35

To illustrate the importance of the ICP to final performance, the formulations below were prepared as shown in Table 4. Upon mixing, dog-bone test samples were prepared for the analysis of the adhesives bulk tensile properties.

TABLE 4

CE2 and Example 5 Formulations and Physical Properties

| Example[a] | Plasticizer[b] wt % | Tackifier[c] wt % | Low Mod PO[d] wt % | ICP[e] wt % | Viscosity[f] cP | RBSP[g] ° C. |
|---|---|---|---|---|---|---|
| CE2 | 34.3 | 45.2 | 20.0 | 0.0 | 8,756 | 85 |
| CE3 | 34.3 | 45.2 | 0.0 | 20.0 | 4,066 | 146 |
| 35 | 34.3 | 45.2 | 10.0 | 10.0 | 5,324 | 145 |

[a]All formulations include 0.5 wt % Tris(2,4-di-tert-butylphenyl) phosphite antioxidant;
[b]Nynas Nyflex 222B Mineral Oil;
[c]Exxon-Mobil Escorez 5615 Petroleum Hydrocarbon Resin;
[d]Exxon-Mobil Vistamaxx 6202 (propylene based elastomer);
[e]LyondellBasell Pro-fax EP501V (propylene-based impact copolymer);
[f]Brookfield at 163° C.;
[g]Ring and ball (Herzog) softening point (glycerol).

After completing the formulation, the remaining portion of the batch (ca. 275 g) in the reaction vessel was removed from the mantel and allowed to cool at room temperature. Needle penetration data were collected from 75 to 25° C. as the mix naturally cooled. Measurements were recorded every 5° C. To obtain reading over the entire temperature range, the needle penetration test was modified from standard conditions by removing additional weights and limiting penetration time to three seconds. Table 5 shows needle penetration data as a function of time and temperature for CE2 and Example 35.

TABLE 5

Development of Surface Hardness
Upon Cooling for CE2 and Example 35

| | Comparative Example 2 | | Example 35 | |
|---|---|---|---|---|
| T, °C. | Time, min | Penetration, mm | Time, min | Penetration, mm |
| 65 | 55 | >37.0 | 50 | 13.0 |
| 60 | 60 | >37.0 | 55 | 9.1 |
| 55 | 67 | >37.0 | 65 | 7.8 |
| 50 | 74 | >37.0 | 69 | 6.2 |
| 45 | 80 | 36.7 | 77 | 4.6 |
| 40 | 82 | 30.5 | 82 | 5.1 |
| 35 | 95 | 27.3 | 96 | 4.3 |
| 30 | 102 | 24.3 | 106 | 3.2 |
| 25 | 174 | 9.6 | 149 | 0.4 |

As shown, Example 35 develops surface hardness more rapidly than CE2, which was prepared using only low modulus polyolefin. The rapid development of stiffness in Example 35 is particularly beneficial in high speed applications where slow-setting, easily deformed adhesives can over-penetrate porous substrates leading to blocking and, in extreme cases, build-up on converting equipment.

Stress-strain curves for Example 35, CE2, and CE3 are shown in FIG. 1. While displaying high elongation, the sample containing only low-modulus polyolefin, CE2, yields extremely easily and offers little resistance to deformation. Conversely, the sample with only ICP, CE3, while is considerably harder to deform, shows low elongation, and is thus relatively brittle. The response of Example 35 which is made from a blend of the low modulus polyolefin and the ICP, falls between the limiting example extremes and providing an adhesive with a good compromise between yield strength and ductility that suitable for elastic and stretch applications. It is worth noting that the mechanical properties of Example 35 fall between those of the physical blends which suggests that the adhesive formulation has sound compatibility even in the solid state.

Together, the needle penetration data and mechanical properties highlight the novelty of this invention. While low modulus polyolefins display good solubility/compatibility with adhesive components and provide highly ductile materials, they generally crystallize slowly or incompletely which can lead to potential problems during application. More crystalline polyolefins and waxes can be used to improve the in-process performance; however, these species tend to have poor compatibility with other adhesive components leading to compromised physical properties and long-term stability issues.

Comparative Examples 4 (Ce4) and Example 36

Examples shown in Table 6 were prepared as described above and physical data for the adhesives appear in Table 7. In order to gauge the compatibility and long-term thermal stability, samples were placed in an oven at 177° C. and the physical appearance observed over time. After 96 hours, the comparative example, CE4, prepared using an ethylene-octene random copolymer showed heavy skinning and insoluble components were seen to form in the mixture. In comparison, the ICP-containing sample, Example 36, showed only slight charring and skin formation.

TABLE 6

CE4 and Example 36 Formulations[a]

| Example[a] | Plasticizer[b] wt % | Tackifier[c] wt % | Low Mod PO[d] wt % | ICP[e] wt % | Engage 8402[f] wt % | Wax[g] Wt % |
|---|---|---|---|---|---|---|
| CE4 | 32.9 | 43.4 | 9.1 | 0.0 | 10.1 | 4.0 |
| 36 | 32.9 | 43.4 | 9.1 | 10.1 | 0.0 | 4.0 |

[a]All formulations include 0.5 wt % Tris(2,4-di-tert-butylphenyl) phosphite antioxidant;
[b]Nynas Nyflex 222B Mineral Oil;
[c]Exxon-Mobil Escorez 5615 Petroleum Hydrocarbon Resin;
[d]Exxon-Mobil Vistamaxx 6202 (propylene based elastomer);
[e]LyondellBasell Pro-fax EP501V (propylene-based impact copolymer);
[f]Dow Engage 8402 Polyolefin Elastomer (ethylene-octene random copolymer);
[g]Alphamin 104N (polyethylene wax homopolymer)

TABLE 7

Physical Data and Thermal Stability of CE4 and Example 36

| Example | Viscosity[a] cP | RBSP[b] wt % | Appearance of Aging (96 h at 177° C.) |
|---|---|---|---|
| CE4 | 3,700 | 98 | Heavy skinning, particles seen to fall from mix |
| 36 | 3,835 | 146 | Slight skinning and char |

[a]Brookfield at 163° C.;
[b]Ring and ball (Herzog) softening point (glycerol).

We claim:

1. A hot melt adhesive composition, comprising a blend of the following components:
    about 2.5% to about 20% by weight, of a nonfunctionalized polypropylene impact copolymer;
    about 2.5% to about 20% by weight, of an olefin based elastomer;
    about 25% to about 65% by weight, of a tackifying resin having a softening point of at least about 80° C. and up to about 140° C.;
    about 20% to 25.5% by weight, of a plasticizer, wherein said plasticizer is mineral oil;
    about 0.1% to about 5% of a stabilizer antioxidant; and
    wherein the components total 100% by weight of the composition, and the viscosity of the composition is equal to or less than about 20,000 mPas at 163° C.

2. The composition of claim 1 comprising about 5% to about 20%, by weight, of the polypropylene impact copolymer.

3. The composition of claim 1 comprising about 7.5% to about 15%, by weight, of the polypropylene impact copolymer.

4. The composition of claim 1 comprising about 5% to about 20%, by weight, of the olefin based elastomer.

5. The composition of claim 1 comprising about 7.5% to about 15%, by weight, of the olefin based elastomer.

6. The composition of claim 1 comprising about 30% to about 60%, by weight, of the tackifying resin.

7. The composition of claim 1 wherein the tackifying resin has a softening point of from about 95° C. to about 140° C.

8. The composition of claim 1 comprising about 1% to about 25%, by weight, of an additional auxiliary polymer selected from the group consisting of EVA, APAO, PE, PP, PB, SIS, SI, SBS, SB, SIBS, SEB, SEBS, SEP, SEPS, SBBS, SEEPS and blends thereof.

9. The composition of claim 8 comprising about 1% to about 15% by weight, of said auxiliary polymer.

10. The composition of claim 1 having a viscosity equal to or less than 15,000 mPas at 163° C.

11. The composition of claim 1 having a viscosity equal to or less than 10,000 mPas at 163° C.

12. The composition of claim 1 having a viscosity equal to or less than 5,000 mPas at 163° C.

13. The composition of claim 1 wherein said propylene impact copolymer has a melt flow rate of between 10 and 250 grams/10 minutes.

14. The composition of claim 1 wherein said propylene impact copolymer has a melt flow rate of between 20 and 2.00 grams/10 minutes.

15. The composition of claim 1 wherein said polypropylene impact copolymer has a melt flow rate of between 50 and 150 grams/10 minutes.

16. The composition of claim 1 wherein said olefin based elastomer is a metallocene polymerized propylene/ethylene copolymer.

17. The composition of claim 16 wherein said metallocene polymerized propylene/ethylene copolymer has from about 5% to about 16% ethylene by weight.

18. The composition of claim 16 wherein said metallocene polymerized propylene/ethylene copolymer has a melt index of from about 1 to about 25.

19. The composition of claim 16 wherein said metallocene polymerized propylene/ethylene copolymer has a density of from about 0.858 grams/cubic centimeter to about 0.888 grams/cubic centimeter.

20. An elastic laminate comprising a first layer of nonwoven material, a second layer of nonwoven material, and one or a plurality of elastomeric substrates disposed between said first and second nonwoven layers, bonded together with the adhesive composition of claim 1.

21. The elastic laminate of claim 20 wherein the one or the plurality of elastomeric substrates are elastic strands.

22. An elastic laminate comprising a first layer of nonwoven material, a second layer of film material, and one or a plurality of elastomeric substrates disposed between said first and second layers, bonded together with the adhesive composition of claim 1.

23. The elastic laminate of claim 22 where the film comprises a polyethylene film, a polypropylene film, an ethylene-propylene copolymer film or a cloth-like coated film material.

24. The elastic laminate of claim 22 wherein the one or a plurality of elastomeric substrates are elastic strands.

25. A laminate comprising a first layer of nonwoven material bonded to a second layer of film material with the adhesive composition of claim 1.

26. The laminate of claim 25 where the film material comprises a polyethylene film, a polypropylene film, an ethylene-propylene copolymer film or a cloth-like coated film material.

27. An article comprising the adhesive composition of claim 1.

28. The article of claim 27 comprising a disposable diaper, a sanitary napkin, a bed pad, a bandage, a surgical drape, a tape, a label, a plastic sheet, a nonwoven sheet, a paper sheet, a cardboard, a book, a filter, or a package.

* * * * *